United States Patent [19]

Carlqvist

[11] Patent Number: 4,693,082
[45] Date of Patent: Sep. 15, 1987

[54] METHOD FOR SUPPLYING HEAT TO AN ENGINE FOR EXTERNAL HEAT SUPPLY BY INTERMITTENT COMBUSTION, AND ENGINE FOR CARRYING OUT THE METHOD

[75] Inventor: Stig G. Carlqvist, Malmö, Sweden

[73] Assignee: Stig G. Carlqvist Motor Consultant, (C.M.C.) Aktiebolag, Malmö, Sweden

[21] Appl. No.: 818,459

[22] Filed: Jan. 13, 1986

[30] Foreign Application Priority Data

Jan. 14, 1985 [SE] Sweden ............... 8500149

[51] Int. Cl.⁴ .............................. F02G 1/04
[52] U.S. Cl. ........................ 60/517; 431/1
[58] Field of Search ............ 60/517; 431/1, 185, 431/354

[56] References Cited

U.S. PATENT DOCUMENTS

| | | | |
|---|---|---|---|
| 1,852,531 | 4/1932 | Kreutzberg | 431/185 |
| 1,870,164 | 8/1932 | Bennis | 431/354 X |
| 2,878,790 | 3/1959 | Paris et al. | 431/1 X |
| 3,042,105 | 7/1962 | Bitterlich | 431/185 X |
| 3,091,224 | 5/1963 | Rydberg | 431/1 X |
| 3,605,405 | 9/1971 | Du Bell et al. | 431/185 |
| 4,484,885 | 11/1984 | Machii et al. | |

Primary Examiner—Allen M. Ostrager
Attorney, Agent, or Firm—Beveridge, DeGrandi & Weilacher

[57] ABSTRACT

In a method for supplying heat to an engine for external heat supply, the combustion of fuel and combustion air takes place intermittently in a combustor. The combustor has a valve system for supplying the combustion air, an injection system for supplying the fuel, a heater for supplying heat to the engine, and an exhaust system for the emission of exhaust gases. The valve system is disposed before the fuel injection system, while a turbolator is disposed between the fuel injection system and the heater for mixing the fuel with the combustion air. The heater is so disposed in the combustor that the intermittent motion of the combustion gases is not interfered with. The engine for carrying out this method is so designed that the valve system is disposed before the fuel injection system and that a turbolator is disposed between the fuel injection system and the heater for mixing fuel and combustion air. The exhaust system comprises an air preheater between the valve system and the fuel injection system, it being possible to recover the residual heat of the combustion gases for preheating the incoming combustion air. An incandescent body is provided in the turbolator for sustaining and ensuring the intermittent combustion.

6 Claims, 2 Drawing Figures

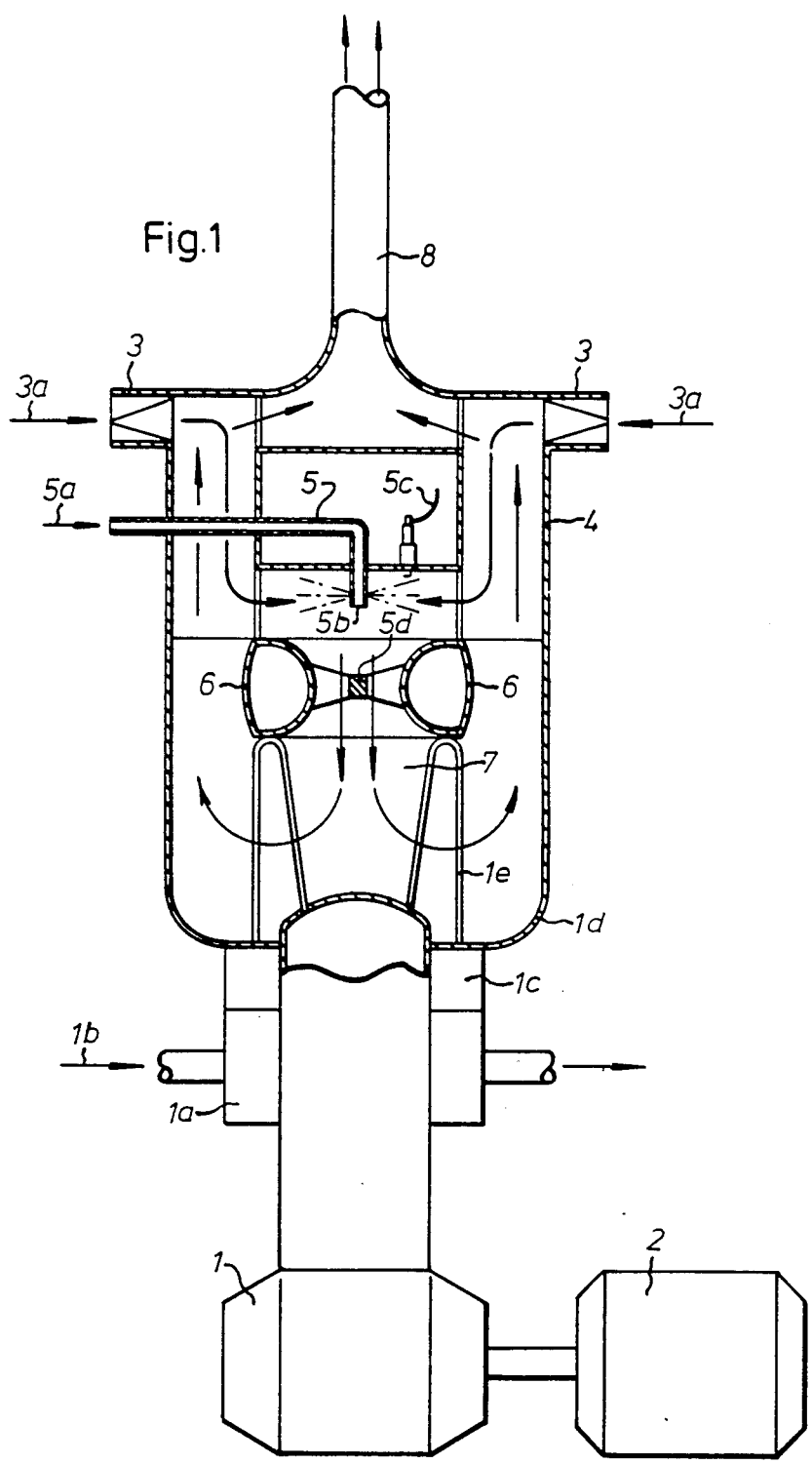

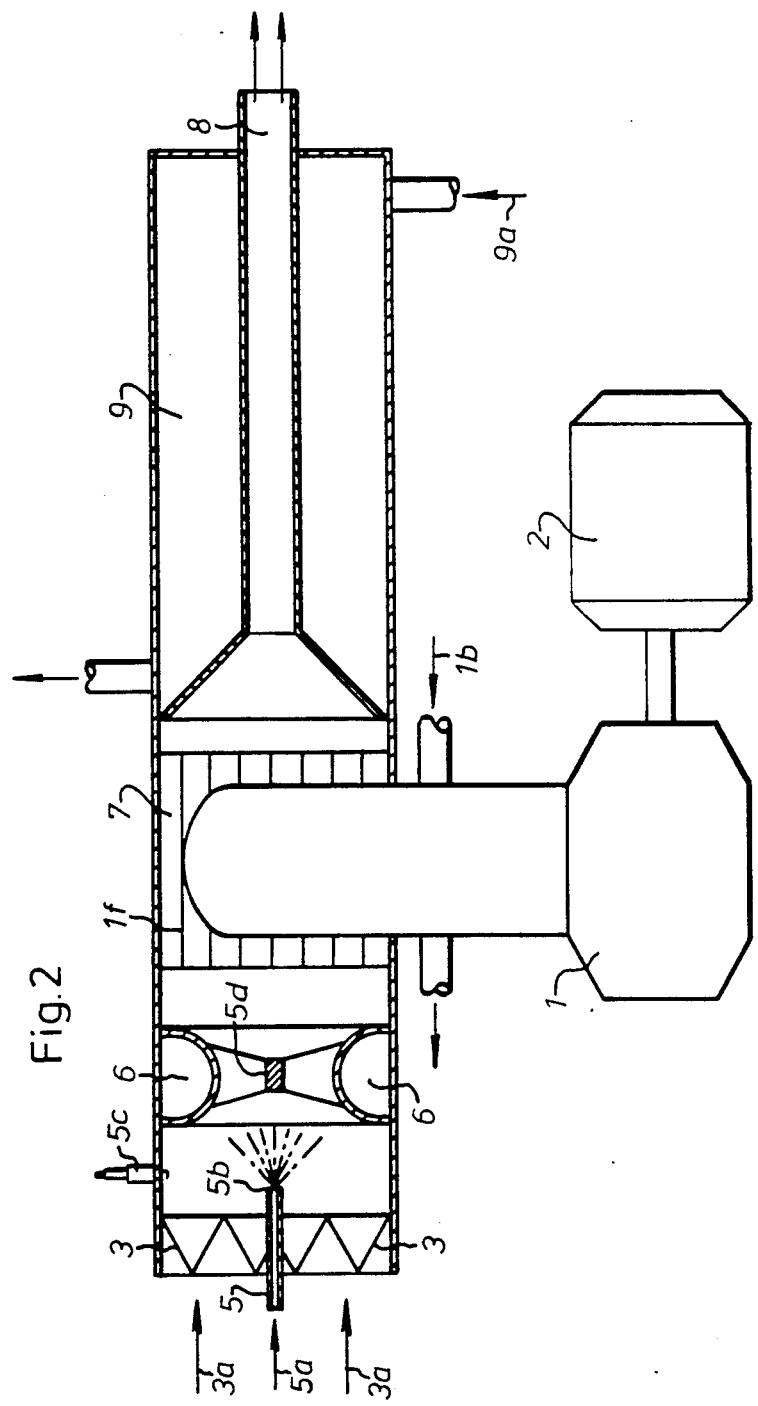

METHOD FOR SUPPLYING HEAT TO AN ENGINE FOR EXTERNAL HEAT SUPPLY BY INTERMITTENT COMBUSTION, AND ENGINE FOR CARRYING OUT THE METHOD

BACKGROUND

The present invention relates to a method for supplying heat to an engine for external heat supply by intermittent combustion, and to an engine for carrying out the method.

A hot-gas engine operates with a closed thermodynamic system in which a working medium, such as hydrogen, helium or air, is supplied with heat from a heater. The heater is supplied with heat externally, for instance by the combustion of fuel in a combustor.

The heat transfer is considerably improved if the combustion is carried out intermittently because the build-up of insulating interfaces in the heater will be obviated by the constantly varying direction and velocity of the combustion gas flow.

Further, it is possible to make the supply of air to the combustor and the discharge of exhaust gases from the combustor occur automatically, whereby there is no need of a fan requiring much energy.

For engines with external heat supply, for instance hot-gas engines, use is normally made of combustors operating with continuous combustion, large heat transfer surfaces and high flow velocities being required for the combustion gases in order to obtain the required heat transfer to the engine. This also gives rise to the need of a powerful fan the energy requirement of which decreases the output of the engine drive shaft to an undesirable extent.

The difficulties of appropriately performing intermittent combustion in engines with external heat supply have entailed that there is today hardly a single practicable method for such purposes.

The object of the present invention is to integrate the function of intermittent combustion in the heater of a hot-gas engine in such a manner that the conditions for heat transfer are satisfied, while maintaining the intermittent combustion.

SUMMARY OF THE INVENTION

According to the invention, this object is achieved by disposing the valve system of the combustor before the air preheater, if any, and before the fuel injection system. In a turbulator, air and fuel are mixed and ignited, during start-up by means of a sparking plug which during the continued operation can be disconnected since spontaneous ignition occurs. In the combustor, the engine heater with heater tubes or fins, is arranged in such a manner that the intermittent motion of the combustion gases will not be impeded. Finally, the exhaust system is arranged in such a manner that residual heat is recovered, either for heating the incoming air or for heating e.g. water for hot water distribution. Also in this part of the combustion system, the conditions for intermittent flow should be satisfied. The intermittent function is achieved by using the momentum of inflowing cold air and the momentum of outflowing hot exhaust gases. The process is controlled by means of the above-mentioned cold and hot gas bodies, the inlet valve and the automatically recurring ignition of the fuel/air mixture in the combustor. The intermittent function entails that the flow of air and exhaust gases will occur automatically at the same time as the heat transfer in the heater of the engine is considerably improved.

BRIEF DESCRIPTION OF THE DRAWINGS

FIG. 1 shows a first and preferred embodiment of the invention, and
FIG. 2 shows a second embodiment of the invention.

DETAILED DESCRIPTION

Examples of such heating systems are illustrated in two different embodiments. FIG. 1 shows a system aiming at maximal shaft output, thus requiring an efficient air preheater. FIG. 2 shows a less sophisticated system where the energy produced is taken out both as shaft output and as hot water. In all hot-gas engines, as in the cases of FIGS. 1 and 2, the heated cooling water from the engine can also be used for heating purposes. The shaft output can be used for driving machines, producing electricity or driving a heat pump or an air conditioning unit.

FIG. 1 illustrates an engine system consisting of a hot-gas engine 1 driving a device 2 which may be a machine, current generator, heat pump or an air conditioning unit. The hot-gas engine has in a per se known manner a cooler 1a with a cooling water supply 1b, and regenerators 1c. The heat supply is effected by means of the heater 1d and the heater tubes 1e. Air enters at 3a into the combustor system through the nonreturn valve 3. In a counterflow air preheater 4, the air is heated and thereafter mixed with fuel 5a from the fuel injector 5b via the fuel pipe 5. During start-up, the fuel is ignited by means of a sparking plug 5c and thereafter automatically ignited by means of recirculating hot combustion gases or by means of a special incandescent body 5d disposed in a turbolator 6 which contributes to an efficient combustion of the fuel/air mixture. The combustion gases thereafter flow through the heater 7 of the hot-gas engine on the outside of its heater tubes 1e. The heat which cannot be used directly by the hot-gas engine is thereafter recovered in the above-mentioned counterflow heat exchanger 4, and the exhaust gases are discharged through the exhaust pipe 8.

FIG. 2 illustrates a less sophisticated variant of the engine system where it is an object to obtain both shaft output and power for heating water. In this case, the hot-gas engine 1 also drives a machine, current generator, heat pump or air conditioning unit 2. The engine is cooled by cooling water 1b which may be used for heating purposes, if appropriate. In this example, the regenerator and cooler of the engine are integrated in the engine cylinder. The engine cylinder projects into the flow of exhaust gases from the combustor and is provided with heater fins 1f for efficient heat transfer. The combustion air 3a intermittently enters through the inlet valves 3, whereupon it is mixed with fuel 5a fed through the fuel pipe 5 and injected by the fuel nozzle 5b. During start-up of the combustor, the fuel is ignited by the sparking plug 5c which is thereafter disconnected, and the intermittent ignition is achieved by recirculating hot exhaust gases or by means of an incandescent body 5d. After combustion, the combustion gases flow through the engine heater 7 where part of the heat content of the gas is transferred to the hot-gas engine. Residual heat is substantially absorbed by a water heater 9 which heats water 9a for utility purposes. The exhaust gases then leave through the exhaust pipe 8.

The two Figures are merely examples of applications of the invention. The fuel to the combustor may be gaseous, liquid or solid in powder form. The mechanical air valve may be an aerodynamic valve. The water heat exchanger in FIG. 2 may be relaced by a gas-to-gas heat exchanger. Finally, the hot-gas engine illustrated in the two Figures may be a free-piston engine producing electricity, hydraulic or pneumatic power.

What I claim and desire to secure by Letters Patent is:

1. A combustor and a hot gas engine,
said combustor comprising a combustion chamber, means for producing intermittent combustion of the fuel within the combustion chamber and intermittent motion of gases in the combustion chamber, said combustion producing means including means for supplying combustion air to the combustion chamber and means for supplying fuel to the combustion chamber, said combustor also including an exhaust means which is located downstream of the combustion chamber for receiving exhaust gases from the combustion chamber and emitting them from the combustor,
said hot gas engine comprising a closed thermodynamic system which has a working medium flowing therethrough, said thermodynamic system including a heater, a regenerator and a cooler, said heater being operable to supply heat to the working medium, said heater being positioned in the combustion chamber of the combustion upstream of the exhaust means and having a shape and position which does not interfere with the intermittent combustion or prevent the flow of gases in the combustion chamber.

2. The combustor and engine as described in claim 1 wherein the engine has a housing which protrudes into the combustion chamber,
said housing having a plurality of external heater fins which are in thermal contact with said heater of the engine, said heater fins being exposed to gases in the combustion chamber so that the intermittent combustion constantly varies the direction and velocity of combustion gases to obviate a build-up of insulating interfaces on said fins.

3. A combustor and engine according to claim 1 wherein the heater includes a plurality of heater tubes which protrude into the combustion chamber and have external surfaces which are exposed to the combustion gases which are constantly varying in direction and velocity due to the intermittent combustion so as to obviate any buildup of insulating interfaces on said tubes.

4. A combustor and engines as described in claim 1 wherein the means for supplying combustion air includes heat exchanger means for transferring heat from hot combustion gases to air which is being supplied to the combustion chamber.

5. A combustor and engine according to claim 4 wherein the heater includes a plurality of heater tubes which protrude into the combustion chamber and have external surfaces which are exposed to the combustion gases which are constantly varying in direction and velocity due to the intermittent combustion so as to obviate any buildup of insulating interfaces on said tubes.

6. A method of operating a hot gas engine and a combustor, wherein a working medium flows through the engine in a closed thermodynamic system which includes a heater, a regenerator and a cooler; said combustor having a combustion chamber and an exhaust means which is located downstream of the combustion chamber, said method comprising the steps of placing the heatear in the combustion chamber upstream of the exhaust means, supplying combustion air arid fuel to the combustion chamber to produce intermittent combustion of fuel in the combustion chamber and intermittent motion of hot gases in the combustion chamber, transferring heat from the hot gases in the combustion chamber to the heater which is located in the combustion chamber, said heat transferring step being performed without interfering with the intermittent combustion or interrupting the flow of gases in the combustion chamber in order to obviate the build-up of insulating interfaces in the heater by constantly varying the direction and velocity of the combustion gases, and moving the gases into and through the exhaust means after their heat has been transferred to the heater.

* * * * *